United States Patent [19]

Clark et al.

[11] 4,341,742
[45] Jul. 27, 1982

[54] CUPROUS CHLORIDE PRODUCTION FROM CHALCOPYRITE

[75] Inventors: Robert H. Clark, Tucson; Joseph P. Wilson, Tubac, both of Ariz.

[73] Assignee: Cyprus Metallurgical Processes Corp., Los Angeles, Calif.

[21] Appl. No.: 261,124

[22] PCT Filed: Oct. 6, 1980

[86] PCT No.: PCT/US80/01315
§ 371 Date: Oct. 6, 1980
§ 102(e) Date: Oct. 6, 1980

[87] PCT Pub. No.: WO82/01197
PCT Pub. Date: Apr. 15, 1982

[51] Int. Cl.³ .................................................. C01G 3/04
[52] U.S. Cl. ........................................ 423/39; 423/493
[58] Field of Search .................... 423/38, 39, 40, 493; 204/107; 75/104, 111–114, 117

[56] References Cited
U.S. PATENT DOCUMENTS 3,764,490 10/1973 Chambers ........................... 204/107
3,776,826 12/1973 Atadan ............................... 204/107
3,785,944 1/1974 Atwood ............................... 75/117
3,901,776 8/1975 Kruesi ................................. 75/117
4,023,964 5/1977 DeMarthe ........................... 423/38
4,097,271 6/1978 Swinkels ............................. 423/34
4,230,487 10/1980 DeMarthe ........................... 75/117

*Primary Examiner*—Brian E. Hearn
*Attorney, Agent, or Firm*—William H. Magidson; William T. McClain; Ralph C. Medhurst

[57] ABSTRACT

A process is disclosed for producing cuprous chloride from chalcopyrite by means of a cupric chloride leach utilizing particular processing conditions in order to obtain relatively high cuprous chloride concentrations. The processing conditions are maintained so as to conduct the leach in accordance with the general reaction:

$(3X+12Y)Cu^{++} + CuFeS_2 + 8YH_2O \rightarrow (4X+12Y)Cu^{++} + XFe^{++} + (2X-2Y)S° + 2YSO_4^{=} + 16YH^{+} + (1-X)CuFeS_2$ under reaction conditions such that "X" is maintained from about 0.35 to about 0.9, "Y" is maintained from about 0.075 to about 0.35 and the sum of $3X+12Y$ is initially greater than 3.

4 Claims, No Drawings

CUPROUS CHLORIDE PRODUCTION FROM CHALCOPYRITE

DESCRIPTION

Technical Field

The invention relates the field of recovering copper from its sulfide ores, particularly chalcopyrite, by hydrometallurgical techniques.

Background Art

Since the comparatively recent promulgation of stringent federal air pollution air control regulations, the copper industry has been actively engaged in the development of hydrometallurgical processes for the recovery of copper from its sulfide ores to replace the prior pyrometallurgical processes. A number of these processes have already been patented. The most favorable of these processes are directed broadly to the solubilization of copper in the copper sulfide ore with various lixiviants, typically ferric chloride and/or cupric chloride.

Atowood U.S. Pat. No. 3,785,944 discloses a process for leaching copper containing materials in two stages with ferric chloride and with cupric chloride. During the cupric chloride leach sodium chloride or other saline metal chloride are added to the system to facilitate the cuprous chloride recovery. This process minimizes sulfate production, and removes any amount produced by calcium precipitation. The highest conversion of feed sulfide sulfur to sulfate permitted during the leach disclosed in Atwood is 4.8%. The maximum initial mole ratio of cupric chloride to feed copper disclosed in Atwood is 1.5, and the highest mole ratio of ferrous chloride generated during the leach to feed copper disclosed in Atwood is 3. The cuprous chloride concentration of the leach liquor leaving the cupric chloride leach stage is about 90 grams per liter, and the mole ratio of cuprous chloride produced in the leach to feed copper is about 2.

Swinkels U.S. Pat. No. 4,097,271 discloses a single stage process for leaching copper concentrates containing metal sulfides with ferric chloride, cupric chloride and chlorine. Swinkels also teaches that production of sulfate during the leach is undesirable, and discloses removal of any formed sulfate with calcium. Swinkels discloses about 5.9% conversion of sulfur to sulfate during the leach. The highest initial mole ratio of cupric chloride to feed copper disclosed in Swinkels is 1.5, and the highest mole ratio of ferrous ions formed during the leach to feed copper is 2.06. The highest mole ratio of cuprous chloride produced to feed copper disclosed in Swinkels is 2.24, and the highest cuprous chloride concentration disclosed is 95 grams per liter.

Milner U.S. Pat. No. 3,798,026 discloses a method for leaching copper bearing material in one stage with ferric chloride. The only cupric chloride present in this process is that generated internally during the leach. Sulfate is produced in Milner, in an undisclosed amount, and as it is taught that sulfate is undesirable, it is controlled by the addition of lime or calcium chloride to remove it from the solution. Milner discloses a total copper concentration at the end of the leach of up to 80 grams per liter, depending on the proportion of cupric to cuprous ions in solution.

U.S. Pat. Nos. 4,013,457 and 3,972,711 to Goens et al., disclose techniques for crystallizing cuprous chloride from various defined solutions.

A paper presented at the Annual AIME Meeting, Hydrometallurigical Section, in Denver, Colo. on Feb. 26, 1978 entitled, "A Hydrometallurgical Process for the Extraction of Copper," by J. H. McNamara, W. A. Ahrens, and J. B. Franek, discloses a two stage ferric chloride-copper chloride process for the leaching of copper concentrates. The process chemistry of the chloride leach is described generally as ferric chloride reacting with chalcopyrite to form ferrous chloride, cupric chloride and sulfur; cupric chloride reacting with chalcopyrite to form cuprous chloride, ferrous chloride and sulfur; and cupric chloride reacting with sulfur and water to form cuprous chloride, sulfuric acid and hydrochloric acid.

The present invention encompasses a particular cupric chloride leach of chalcopyrite within a defined balance of reaction conditions in order to produce a solution of relatively high cuprous chloride concentration to that of the prior art. The process requires no additional reagents, such as sodium or other alkali metal chlorides, and accomplishes the high cuprous chloride production with a relatively mild cupric chloride leach, containing essentially no ferric chloride. As a result, extremely high chalcopyrite dissolution within the cupric chloride stage is not required, even though the product solution results in high cuprous chloride concentrations. The remaining unreacted chalcopyrite may be treated thereafter in order to further recover its values.

Disclosure of the Invention

The process comprises producing cuprous chloride from copper sulfide ores containing chalcopyrite by maintaining a balance of particular reaction conditions in order to conduct the leach in accordance with the general reaction:

$(3X+12Y)Cu^{++}+CuFeS_2+8YH_2O \rightarrow (4X+12Y)Cu^+ + XFe^{+++} + (2X-2Y)S° + 2YSO_4^= +$ 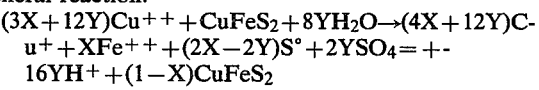
$16YH^+ + (1-X)CuFeS_2$ wherein X is maintained from about 0.35 to about 0.9, Y is maintained from about 0.075 to about 0.4, and the sum of $3X+12Y$ is initially greater than 3. Maintaining the reaction is predicated upon the proper selection and balance of the reaction temperature, the reaction time, the initial mole ratio of cupric chloride to feed copper as chalcopyrite and the concentration of ferrous chloride maintained during the leach.

Best Mode for Carrying Out the Invention

The process of the present invention is applicable to copper sulfide ores containing chalcopyrite. Most naturally occurring copper sulfide ores, such as chalcocite, covellite and digenite, are much more easily leachable than chalcopyrite. When the process of the present invention is employed with mixed copper sulfides containing chalcopyrite, it is to be understood by the artisan that the initial selection of the reaction conditions may be based upon the relative amount of chalcopyrite present, with modifications being made in order to accommodate the amount and type of other copper sulfides present. In other words, when the feed copper as chalcopyrite is less than the total copper being introduced, the overall reaction conditions will vary from those set forth herein as being required, but the conditions set forth herein will be met with respect to the leach reaction as it applies to chalcopyrite. For example, an initial mole ratio of cupric chloride lixiviant of about 4 to 1 based upon copper in the feed as chalcopyrite may be desirable, but due to significant amounts of other copper sulfides being introduced with the feed, the actual mole ratio of cupric chloride to total copper in the feed may vary from this value. Similarly, other reaction conditions may also change in order to accommodate the constituency of the feed copper.

The raw copper bearing ore is preferably initially concentrated in accordance with conventional techniques, such as flotation. The copper bearing concentrate is then sized as required to preferably 95 percent minus 200 mesh, and most preferably 70 percent minus 325 mesh.

It has been discovered that the leach reaction of chalcopyrite with only cupric chloride can be represented by the following equation:

$$(3X+12Y)Cu^{++} + CuFeS_2 + 8YH_2O \rightarrow (4X+12Y)Cu^+ + XFe^{+++} + (2X-2Y)S° + 2YSO_4^{=} + 16YH^+ + (1-X)CuFeS_2$$

The leach chemistry is quite complex, and the mechanisms and intermediate reactions are not set forth by this reaction equation. The equation is derived by means of a combination of experimental testing and known reaction stoichiometry. The process of the invention employs this novel appreciation of the process chemistry with a balance of reaction parameters in order to produce significantly higher concentrations of cuprous chloride, and significantly higher conversions of cuprous chloride produced per copper as chalcopyrite added as feed, than the processes of the prior art. Furthermore, the process is preferably conducted without the addition of external reagents, such as alkali and alkaline earth metal chlorides, which then must be accommodated in order to further process the product cuprous chloride solution.

The "X" value of the equation designates the molar amount of copper fed as chalcopyrite which is converted to cuprous ion. The process is preferably conducted so as to maintain "X" within a range of value from about 0.35 to about 0.90 based upon one mole of feed copper as chalcopyrite. The particular value selected is a matter of choice, as the selection is accomplished by employing the proper balance of reaction conditions as hereinafter described.

The "Y" value of the equation represents the molar amount of feed sulfur introduced as chalcopyrite which is converted to sulfate. As two moles of sulfur exist in the chalcopyrite molecule per mole of copper, 2("Y") moles of sulfate form for each mole of chalcopyrite reacted. Chalcopyrite sulfur not converted to sulfate is produced as solid elemental sulfur. As a novel feature of the present invention it is preferred that the leach reaction be conducted within a "Y" range of about 0.075 to about 0.4. It is to be appreciated that the prior art recognizes the conversion of some chalcopyrite sulfur to sulfate, but in all known prior art processes the amount of sulfate permitted to be converted is maintained as less than in the process of the present invention. An appreciation of the leach reaction set forth herein demonstrates that by permitting more sulfur introduced as chalcopyrite to convert to sulfate, significantly higher cuprous chloride concentrations concomitantly result. Like the "X" value, the appreciation of the proper selection of the "Y" value is considered a novel feature of the invention, and is a matter of choice within the given range. The selection is accomplished by maintaining the proper balance of reaction conditions as herein set forth.

Further novel features of the invention include the discovery of reaction conditions which can be controlled in order to conduct the given leach equation in accordance with desired preselected "X" and "Y" values. The primary variables to be controlled and balanced with each other include the initial mole ratio of cupric chloride to chalcopyrite copper (designated by the reaction coefficient 3X+12Y), the reaction temperature, the reaction time, and the initial ferrous chloride to feed chalcopyrite copper mole ratio. Other conditions, such as concentrate mineralogy and particle size distribution, leach agitation rate, etc. are also obviously important to the conduct of the leach reaction, but are deemed within the knowledge and skill of the artisan once the novel features are appreciated.

A particularly important processing parameter is the initial mole ratio of cupric chloride lixiviant to copper as chalcopyrite in the feed. Prior art processes employing a cupric chloride leach of chalcopyrite generally disclose mole ratios within a range of about 1.5 to 2.5 moles of cupric chloride per mole of chalcopyrite copper. It has been found that significantly increased production of cuprous chloride can be achieved in accordance with the process of the present invention when the mole ratio of cupric chloride to copper as chalcopyrite is initially greater than about 3. The initial mole ratio of cupric chloride to chalcopyrite copper also directly affects the amount of chalcopyrite sulfur converted to sulfate, the "Y" vaue. Increasing this mole ratio tends to increase the value of "Y." The initial mole ratio of cupric chloride to chalcopyrite copper is therefore determined in accordance with the desired "X" and "Y" values, as long as the "X" and "Y" values are selected such that the sum of 3X+12Y exceeds 3. From a practical standpoint, if this mole ratio exceeds about 6, the "Y" value will approach the maximum permissible value within the scope of the invention, i.e., 0.40. Therefore, the mole ratio of cupric chloride to chalcopyrite feed is preferably maintained within the range of from about 3 to about 6, and more preferably from about 3.5 to about 5.5.

The proper selection of the cupric chloride to chalcopyrite copper mole ratio must be made in the context in the selection of the initial ferrous chloride to chalcopyrite copper mole ratio, the reaction temperature and the reaction time. As each of these stated parameters vary the vaues of "X" or "Y" or both, each must be selected while taking into account its effect upon the others.

Generally the temperature is to be selected within the range of about 80° C. to the solution boiling point. The solution boiling point is approximately 107° C., varying, of course, with salt concentrations. Temperature affects the rate of the reaction, and it is generally found that at temperatures less than 80° C. the rates are too slow to be practical. It has been surprisingly observed that the "X" value essentially does not vary significantly with temperature, particularly above 90° C., but increased temperatures tend to increase the "Y" value. Hence, the amount of chalcopyrite sulfur permitted to be converted to sulfate can be conveniently controlled by adjusting the temperature, while essentially not affecting the amount of chalcopyrite copper converted to cuprous chloride.

The effect of the reaction retention time is essentially the same as the reaction temperature. Increased retention times tend to increase the "Y" value, while surprisingly essentially not affecting the "X" value. The reaction time is generally selected so as to fall within the range of about 2 to 12 hours, but again it is to be appreciated that a particular time within this range is required in order to properly control the selected values of "X" and "Y."

A further significant reaction variable is the initial concentration of ferrous chloride. Ferrous chloride is preferred as the solvent for the initial cupric chloride lixiviant and the resulting cuprous chloride product primarily due to the fact that chalcopyrite contains equal molar amounts of iron and copper. Therefore for each mole of copper entering into solution, a mole of iron also enters into solution. Further processing of the cuprous chloride product must therefore be compatible with the ferrous chloride produced. By initially selecting a ferrous chloride medium no additional process impurities, such as alkali and/or alkaline earth metals, are introduced to the leach. Further, since ferrous chloride is produced in accordance with the conduct of the process of the invention, it is readily available for recirculation and/or downstream processing, as desired. The initial ratio of ferrous chloride to chalcopyrite copper affects both the "X" and "Y" values. Increased ferrous chloride concentration ratios tend to increase both the values of "X" and "Y." Preferably from about 3 to about 5 moles of ferrous chloride per mole of chalcopyrite copper are initially employed, and again the determination of a reasonably precise value is required in order to properly maintain the "X" and "Y" values at the desired levels.

The resulting products from the leach reaction may then be further processed as desired. Numerous techniques known to the art may be employed for the further processing of cuprous chloride in order to produce elemental copper. Electrolytic and cementation processing, as are well known in the art, are suitable processing techniques. The process was specifically developed, however, for the process as generally disclosed in U.S. Pat. Nos. 4,013,457; 3,972,711; 4,039,324; 4,124,379; 4,101,315; and 4,138,248, the specifications of which are herein incorporated by reference.

EXAMPLE 1

A 94.8 gram concentrate containing 31.6 weight percent copper, 29.6 weight percent iron and 33.2 weight percent sulfur, along with trace amounts of zinc, silver, calcium, magnesium, aluminum and pyrite, essentially 100 percent of which copper existed as chalcopyrite, was leached with a cupric chloride-ferrous chloride solution at a temperature of 100° C. for a time of 6 hours. The cupric chloride to feed copper mole ratio was initially 4.0, and the ferrous chloride to feed copper concentrate was initially 4.0. The reaction resulted in 65 percent of the chalcopyrite copper being converted to cuprous chloride, and 12.7 percent of the chalcopyrite sulfur being converted to sulfate. 4.12 moles of cuprous chloride were produced, resulting in a cuprous chloride product concentration of about 123 grams per liter.

EXAMPLE 2

Five separate 94.8 gram samples having the same chemical analysis and chalcopyrite composition as that set forth in Example 1 were separately leached at 100° C. for 6 hours with a cupric chloride-ferrous chloride solution. The ferrous chloride to copper as chalcopyrite mole ratio was initially 4.0, and the cupric chloride ratio was varied. Table 1 sets forth the cupric chloride mole ratio for each sample, as well as the process conditions and product results.

EXAMPLE 3

Three samples of a concentrate possessing the same chemical composition and chalcopyrite constituency as in Examples 1 and 2 were leached at a temperature of 100° C. for 5 hours with a cupric chloride-ferrous chloride solution. Each sample was 94.8 grams, and the mole ratio of cupric chloride to copper as chalcopyrite feed was initially 4.0. The mole ratio of ferrous chloride to copper as chalcopyrite feed was varied for each of the samples. Table 2 sets forth the conditions and results of these samples.

EXAMPLE 4

Twelve samples, each 101.5 grams, having a chemical composition of 29.55 weight percent copper, 30.9 weight percent iron and 34.9 weight percent sulfur, along with trace amounts of zinc, silver, calcium, magnesium, aluminum and pyrite, and having a composition of copper as chalcopyrite of essentially 100 percent, were separately treated in accordance with the conditions designated in Table 3. Table 3 also sets forth the results of each of the leach experiments.

EXAMPLE 5

A feed composition containing 30.3 percent copper, 29 percent iron and 33.7 percent sulfur, along with zinc, silver, calcium, magnesium, aluminum and pyrite in trace amounts, was leached at 100° C. with a cupric chloride-ferrous chloride solution. The feed copper composition was essentially 100 percent chalcopyrite, and each sample size was 99 grams. The initial ferrous chloride to feed copper mole ratio was 4.4, and the initial cupric chloride to feed copper mole ratio was 4.7. The time was varied as set forth in Table 4, along with the results of each of the experiments.

TABLE 1

| Sample No. | Mole ratio $CuCl_2/Cu$ as chalcopyrite feed | Mole ratio $FeCl_2/Cu$ as chalcopyrite feed | Temp. (°C.) | Time (hrs.) | X | Y | 4X + 12Y observed | 4X + 12Y calculated | Final CuCl concentration (g/l) |
|---|---|---|---|---|---|---|---|---|---|
| 2A | 1.0 | 4.0 | 100 | 6 | 0.23 | 0.025 | 1.21 | 1.22 | 36.3 |
| 2B | 2.0 | 4.0 | 100 | 6 | 0.33 | 0.058 | 2.00 | 2.02 | 60.0 |
| 2C | 3.0 | 4.0 | 100 | 6 | 0.50 | 0.115 | 3.35 | 3.38 | 100.5 |
| 2D | 4.0 | 4.0 | 100 | 6 | 0.60 | 0.152 | 4.18 | 4.22 | 125.4 |
| 2E | 5.0 | 4.0 | 100 | 6 | 0.69 | 0.202 | 5.14 | 5.18 | 154.2 |

TABLE 2

| Sample No. | Mole ratio CuCl$_2$/Cu as chalcopyrite feed | Mole ratio FeCl$_2$/Cu as chalcopyrite feed | Temp. (°C.) | Time (hrs.) | 4X + 12Y observed | Final CuCl concentration (g/l) |
|---|---|---|---|---|---|---|
| 3A | 4.0 | 1.1 | 100 | 5 | 3.07 | 92.1 |
| 3B | 4.0 | 2.6 | 100 | 5 | 3.73 | 111.9 |
| 3C | 4.0 | 4.6 | 100 | 5 | 4.43 | 132.9 |

TABLE 3

| Sample No. | Mole ratio CuCl$_2$/Cu as chalcopyrite feed | Mole ratio FeCl$_2$/Cu as chalcopyrite feed | Temp. (°C.) | Time (hrs.) | X | Y | 4X + 12Y observed | 4X + 12Y calculated | Final CuCl concentration (g/l) |
|---|---|---|---|---|---|---|---|---|---|
| 4AA | 2.0 | 4.0 | 90 | 6 | 0.28 | 0.035 | 1.52 | 1.54 | 45.6 |
| 4AB | 2.0 | 4.0 | 95 | 6 | 0.29 | 0.043 | 1.65 | 1.68 | 49.5 |
| 4AC | 2.0 | 4.0 | 100 | 6 | 0.31 | 0.052 | 1.83 | 1.86 | 54.9 |
| 4AD | 2.0 | 4.0 | 103 | 6 | 0.32 | 0.058 | 1.95 | 1.98 | 58.5 |
| 4BA | 3.0 | 4.0 | 90 | 6 | 0.36 | 0.064 | 2.20 | 2.21 | 66.0 |
| 4BB | 3.0 | 4.0 | 95 | 6 | 0.38 | 0.065 | 2.28 | 2.30 | 68.4 |
| 4BC | 3.0 | 4.0 | 100 | 6 | 0.39 | 0.078 | 2.49 | 2.50 | 74.7 |
| 4BD | 3.0 | 4.0 | 103 | 6 | 0.41 | 0.098 | 2.80 | 2.82 | 84.0 |
| 4CA | 4.0 | 4.0 | 90 | 6 | 0.59 | 0.088 | 3.40 | 3.42 | 102.0 |
| 4CB | 4.0 | 4.0 | 95 | 6 | 0.60 | 0.125 | 3.86 | 3.90 | 115.8 |
| 4CC | 4.0 | 4.0 | 100 | 6 | 0.62 | 0.152 | 4.26 | 4.30 | 127.8 |
| 4CD | 4.0 | 4.0 | 105 | 6 | 0.62 | 0.173 | 4.52 | 4.55 | 135.6 |

TABLE 4

| Sample No. | TIME, Hrs. | X | Y | 4X + 12Y observed | 4X + 12Y calculated | Final CuCl Concentration (g/l) |
|---|---|---|---|---|---|---|
| 5A | 0.25 | 0.39 | 0.015 | 1.73 | 1.74 | 51.9 |
| 5B | 0.50 | 0.44 | 0.036 | 2.19 | 2.19 | 65.7 |
| 5C | 1.0 | 0.52 | 0.054 | 2.71 | 2.73 | 81.3 |
| 5D | 2.0 | 0.62 | 0.075 | 3.36 | 3.36 | 100.8 |
| 5E | 3.0 | 0.62 | 0.100 | 3.66 | 3.68 | 109.8 |
| 5F | 4.0 | 0.62 | 0.130 | 4.02 | 4.04 | 120.6 |
| 5G | 5.0 | 0.62 | 0.148 | 4.24 | 4.26 | 127.2 |
| 5H | 6.0 | 0.62 | 0.163 | 4.42 | 4.43 | 132.6 |

We claim:

1. A process for producing cuprous chloride from copper sulfide ores containing chalcopyrite comprising performing an initial leach of the chalcopyrite in accordance with the general reaction:

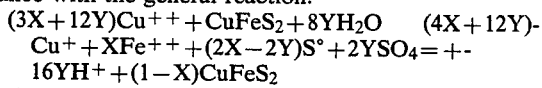

under a balance of reaction conditions of reaction temperature and time, of initial mole ratio of cupric ion to chalcopyrite copper and of initial mole ratio of ferrous chloride to chalcopyrite copper, such that "X" is maintained from about 0.35 to about 0.9, "Y" is maintained from about 0.075 to about 0.4, and the initial summation of 3X+12Y is greater than 3, wherein the cupric ion to chalcopyrite copper mole ratio is initially within the range of about 3 to about 6, the ferrous chloride to chalcopyrite copper mole ratio is initially at least 3, the reaction temperature is maintained from about 80° C. to the solution boiling point, and the reaction is conducted for a time of from about 2 to about 12 hours.

2. A process for producing cuprous chloride from copper sulfide ores containing chalcopyrite comprising performing an initial leach of the chalcopyrite in accordance with the general reaction:

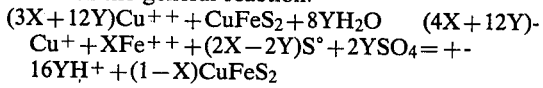

under particular reaction conditions of temperature, time, initial mole ratio of cupric ion to chalcopyrite copper and initial mole ratio of ferrous chloride to chalcopyrite copper so as to maintain a predetermined value of "X" within a range of about 0.35 to about 0.9, a predetermined value of "Y" within the range of about 0.075 to about 0.35 and the initial summation of 3X+12Y is greater than 3, wherein the cupric ion to chalcopyrite copper mole ratio is initially within the range of about 3 to about 6, the ferrous chloride to chalcopyrite copper mole ratio is initially at least 3, the reaction temperature is maintained from about 80° C. to the solution boiling point, and the reaction is conducted for a time of from about 2 to about 12 hours.

3. A process for producing cuprous chloride from a copper sulfide ore comprising performing an initial leach of the ore with a mole ratio of cupric chloride to copper sulfide copper of from about 3 to about 6 in the presence of a mole ratio of ferrous chloride to copper sulfide copper of at least about 3 within a temperature range of about 80° C. to the solution boiling point in a time of from about 2 to about 12 hours in order to convert from about 40% to about 85% of the copper sulfide copper to cuprous chloride and in order to convert from about 7.5% to about 35% of the copper sulfide sulfur to sulfate.

4. In a process for producing elemental copper from copper sulfide concentrates containing chalcopyrite wherein the copper sulfide concentrate is initially leached with cupric chloride to produce a solution comprising cuprous chloride, cupric chloride and ferrous chloride, the solution is separated from the resulting solids, at least a portion of the cuprous chloride is crystallized from the product solution, the cuprous chloride crystals are treated to produce elemental copper, the mother liquor from the cuprous chloride crystallization is treated in order to remove at least a portion of the impurities and to oxidize ferrous chloride to ferric chloride and cuprous chloride to cupric chloride, and the solids from the initial leach are treated with the oxidized ferric chloride-cupric chloride solution in order to leach at least a portion of the remaining copper sulfides, the improvement comprising conducting the initial leach reaction in accordance with the following general formula:

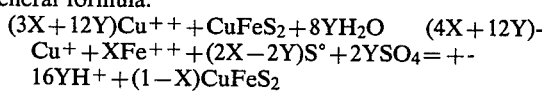

under a balance of reaction conditions of reaction temperature and time, of initial mole ratio of cupric ion to chalcopyrite copper and of initial mole ratio of ferrous chloride to chalcopyrite copper, such that "X" is maintained from about 0.35 to about 0.9, "Y" is maintained from about 0.075 to about 0.4, and the initial summation of $3X+12Y$ is greater than 3, wherein the cupric ion to chalcopyrite copper mole ratio is initially within the range of about 3 to about 6, the ferrous chloride to chalcopyrite copper mole ratio is initially at least 3, the reaction temperature is maintained from about 80° C. to the solution boiling point, and the reaction is conducted for a time of from about 2 to about 12 hours.

* * * * *

UNITED STATES PATENT OFFICE
CERTIFICATE OF CORRECTION

Patent No. 4,341,742              Dated July 27, 1982

Inventor(s) Robert H. Clark and Joseph P. Wilson

It is certified that error appears in the above-identified patent and that said Letters Patent are hereby corrected as shown below:

| Col. | Line | |
|---|---|---|
| 2 | 5 | "Hydrometallurigical" should read --Hydrometallurgical-- |
| 2 | 40-41 | "C-u$^+$" should read --Cu$^+$-- |
| 3 | 20-21 | "C-u$^+$" should read --Cu$^+$-- |
| 3 | 60 | "as less" should read --at less-- |
| 4 | 33 | "vaue" should read --value-- |
| 4 | 51 | "the vaues" should read --the values-- |

Claim 1, line 5:

"$(3X+12Y)Cu^{++} + CuFeS_2 + 8YH_2O \quad (4X+12Y)-$"

should read --$(3X+12Y)Cu^{++} + CuFeS_2 + 8YH_2O \longrightarrow (4X+12Y)-$ --

Claim 2, line 5:

"$(3X+12Y)Cu^{++} + CuFeS_2 8YH_2O \quad (4X+12Y)-$"

should read --$(3X+12Y)Cu^{++} + CuFeS_2 + 8YH_2O \longrightarrow (4X+12Y)-$ --

UNITED STATES PATENT OFFICE
CERTIFICATE OF CORRECTION

Patent No. 4,341,742  Dated July 27, 1982

Inventor(s) Robert H. Clark and Joseph P. Wilson

It is certified that error appears in the above-identified patent and that said Letters Patent are hereby corrected as shown below:

Claim 4, line 20 "$(3X+12Y)Cu^{++} + CuFeS_2 + 8YH_2O \quad (4X+12Y)-$"

should read $--(3X+12Y)Cu^{++} + CuFeS_2 + 8YH_2O \longrightarrow (4X+12Y)- \quad --$ Signed and Sealed this Fourteenth Day of August 1984

[SEAL]

Attest:

Attesting Officer

GERALD J. MOSSINGHOFF

Commissioner of Patents and Trademarks